Patented July 8, 1947

2,423,613

UNITED STATES PATENT OFFICE 2,423,613

METHOD OF MANUFACTURING ICE CREAM AND PRODUCT THEREOF

Bernard Nelson, New York, N. Y., assignor to Lanco Products Corporation, New York, N. Y., a corporation of New York No Drawing. Application December 14, 1944, Serial No. 568,209

17 Claims. (Cl. 99—136)

The present invention relates to food products and more particularly to an improved process for the manufacture of ice creams, sherbets, ices and similar confections.

One of the important considerations in the manufacture of ice cream, sherbets and ices is to secure a satisfactory overrun, or increase in volume of the mix, and to secure this satisfactory overrun in as short a time as possible.

Ice cream mixtures when frozen and placed in storage at refrigeration temperatures tend to acquire a grainy texture due to the formation and growth of ice crystals and it is desirable to include in the mix before freezing materials like gelatin or algin to reduce this effect, but these materials generally tend to unfavorably affect the overrun.

The overrun can be increased by whipping the ice cream for a longer time, but any increase in the duration of the whipping is accompanied by an increase in the graininess of the product. It therefore becomes an important consideration to obtain a sufficient overrun in as short a time as possible.

It is an object of the present invention to provide an ice cream manufacturing process which will give a satisfactory overrun.

A further object is to provide materials which may be incorporated in the ice cream mix before freezing to favorably influence the overrun.

A further object is to provide materials which may be incorporated in the ice cream mix before freezing to offset the unfavorable effect on the overrun of texture-improving materials such as gelatin and algin.

A further object is to provide an ice cream manufacturing process in which satisfactory overruns can be secured in a short time notwithstanding the presence in the unfrozen mix of crystal growth inhibiting materials of the nature of gelatin or algin. It is also an object of the invention to provide an ice cream having an improved texture.

In accordance with the invention it has been found that the foregoing objects can be attained by including in the ice cream mix before it is subjected to freezing a small amount of a mixed diglyceride of two different acids, one of which is a higher fatty acid and the other of which is an aromatic carboxylic acid. These mixed diglycerides are esters of glycerol and two different organic acids in which one of the hydroxyl groups of the glycerol remains free and unesterified. The fatty acid may be any one of the naturally-occurring higher fatty acids found in the natural animal and vegetable oils and fats, such as tallow, butter fat, cocoanut oil, olive oil, cottonseed oil, hog lard, beef fat, and other edible fats and oils. These fatty acids are typified by stearic acid, oleic acid, palmitic acid, and linoleic acid, with each of which satisfactory results have been obtained.

Satisfactory results have been obtained when an aromatic mono-carboxylic acid such as benzoic acid, naphthenic acid and salicylic acid has been used to supply the aromatic carboxylic constituent of the mixed glyceryl diester used in the process. Any other aromatic carboxylic acid that will form mixed diesters of glycerol and which does not contribute objectionable color, odor or other undesirable characteristics to the resulting diester may be employed in forming mixed diesters useful for the purposes herein described.

The mixed diesters of glycerol suitable for use in the present invention include all of the mixed diesters of glycerol in which one of the glycerol hydroxyl groups is esterified with any one of the acids from the fatty acid group and another of the glycerol hydroxyl groups is esterified with any one of the acids from the other group of acids defined above.

The term "mixed" diester of glycerol is used to indicate diesters in which each glycerol molecule has been esterified with two different acids, as distinguished from a mixture of different glyceryl esters each of which has two of the alcohol groups of each molecule esterified with the same acid.

The mixed diesters of glycerol exist in three isomeric forms. Thus, taking the diesters of stearic acid and benzoic acid as an example, the possible isomeric compounds are glyceryl α-stearate-γ-benzoate, glyceryl α-stearate β-benzoate, and, glyceryl α-benzoate β-stearate. Diesters of all three types are suitable for the purposes of the present invention. I prefer, however, to use the α,γ diesters.

The mixed diesters of glycerol with naphthenic acid and a higher fatty acid have been found to be good oil-in-water emulsifying agents for general use in the arts as well as useful in improving the overrun of ice cream. These mixed diesters may be prepared by heating one mol of α,γ-glycerol dichlorhydrin for about two hours at 150–170° C. with one mol of the sodium salt of naphthenic acid and one mol of the sodium salt of the desired fatty acid, for example, sodium stearate. Two mols of sodium chloride are split off, with the formation of the mixed glyceryl diester. The mixed diester is insoluble in water and can therefore be readily recovered from the sodium chloride and the water soluble starting materials by washing with boiling water. The product can be further purified, if desired, by dissolving the same in benzene and evaporating the solvent, but for the purposes of the present invention this further refinement of the product is unnecessary.

The improvement in overrun while at the same time producing an ice cream of satisfactory texture is secured by adding a small amount of the mixed glycerol diester to the conventional ice cream ingredients such as cream, milk, skim milk and sugar at the time the batch is made up. The diester can be included in the mix along with gelatin, algin, or similar materials, and its presence will tend to offset any unfavorable influence on the overrun which these materials may tend to have.

Only small amounts of the esters are required to materially improve the overrun and to produce a desirable degree of overrun in a short time. For most conventional ice cream mixtures, an amount of the order of 0.1% to 0.2%, based on the weight of the entire mix, will be sufficient. The amount may be varied by the operator depending upon his requirements for the particular mix.

Compositions suitable for sale to the ice cream manufacturer may if desired include an innocuous edible extender to increase the bulk of the material and thus facilitate the weighing out in the plant of the very small amounts required for a single batch.

The invention is equally applicable to the manufacture of ice cream, sherbets, ices and other frozen confections and it is intended that the term "ice cream" as used herein include all of these products.

I claim:

1. The method of making an improved ice cream which comprises incorporating a mixed glycerol diester of a higher fatty acid and an aromatic carboxylic acid in the unfrozen ice cream mix and thereafter subjecting the mix to freezing conditions.

2. The method of making an improved ice cream which comprises incorporating a mixed glycerol diester of a higher fatty acid and benzoic acid in an unfrozen ice cream mix and then subjecting the mix to freezing conditions.

3. The method of making an improved ice cream which comprises incorporating a mixed glycerol diester of a higher fatty acid and naphthenic acid in an unfrozen ice cream mix and then subjecting the mix to freezing conditions.

4. The method of making an improved ice cream which comprises incorporating a mixed glycerol diester of a higher fatty acid and salicylic acid in an unfrozen ice cream mix and then subjecting the mix to freezing conditions.

5. The method of making an improved ice cream which comprises incorporating a mixed glycerol diester of stearic acid and benzoic acid in an unfrozen ice cream mix and then subjecting the mix to freezing conditions.

6. The method of making an improved ice cream which comprises incorporating a mixed glycerol diester of stearic acid and naphthenic acid in an unfrozen ice cream mix and then subjecting the mix to freezing conditions.

7. The method of making an improved ice cream which comprises incorporating a mixed glycerol diester of stearic acid and salicylic acid in an unfrozen ice cream mix and then subjecting the mix to freezing conditions.

8. The method of making an improved ice cream which comprises incorporating a mixed glycerol diester of oleic acid and naphthenic acid in an unfrozen ice cream mix and then subjecting the mix to freezing conditions.

9. An improved food product comprising ice cream containing a mixed glycerol diester of a higher fatty acid and an aromatic carboxylic acid.

10. An improved food product comprising ice cream containing a mixed glycerol diester of a higher fatty acid and benzoic acid.

11. An improved food product comprising ice cream containing a mixed glycerol diester of a higher fatty acid and naphthenic acid.

12. An improved food product comprising ice cream containing a mixed glycerol diester of a higher fatty acid and salicylic acid.

13. An improved food product comprising ice cream containing a mixed glycerol diester of stearic acid and benzoic acid.

14. An improved food product comprising ice cream containing a mixed glycerol diester of oleic acid and benzoic acid.

15. An improved food product comprising ice cream containing a mixed glycerol diester of stearic acid and naphthenic acid.

16. An improved food product comprising ice cream containing a mixed glycerol diester of stearic acid and salicylic acid.

17. An improved food product comprising ice cream containing a mixed glycerol diester of oleic acid and naphthenic acid.

BERNARD NELSON.

REFERENCES CITED

The following references are of record in the file of this patent:

UNITED STATES PATENTS

| Number | Name | Date |
|---|---|---|
| 2,065,398 | Roth et al. | Dec. 22, 1936 |
| 2,355,547 | Musher | Aug. 8, 1944 |
| Re. 21,322 | Harris | Jan. 16, 1940 |
| 1,558,299 | Schwartz | Oct. 20, 1925 |
| 2,145,443 | Harris | Jan. 31, 1939 |
| 2,395,061 | Musher | Feb. 19, 1946 |